United States Patent
Morihashi et al.

(10) Patent No.: US 11,541,500 B2
(45) Date of Patent: Jan. 3, 2023

(54) NUMERICAL CONTROL DEVICE, PROGRAM RECORDING MEDIUM, AND CONTROL METHOD

(71) Applicant: FANUC CORPORATION, Yamanashi (JP)

(72) Inventors: Ryou Morihashi, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/910,996

(22) Filed: Jun. 24, 2020

(65) Prior Publication Data
US 2020/0406416 A1 Dec. 31, 2020

(30) Foreign Application Priority Data

Jun. 25, 2019 (JP) .............................. JP2019-117548
May 18, 2020 (JP) .............................. JP2020-086543

(51) Int. Cl.
*B23Q 15/013* (2006.01)
*B23Q 15/08* (2006.01)
(Continued)

(52) U.S. Cl.
CPC ........... *B23Q 15/013* (2013.01); *B23Q 15/08* (2013.01); *B23Q 17/10* (2013.01);
(Continued)

(58) Field of Classification Search
None
See application file for complete search history.

(56) References Cited

U.S. PATENT DOCUMENTS 3,665,493 A * 5/1972 Glowzewski ...... G05B 19/4163
                                                    318/561
2009/0107308 A1 * 4/2009 Woody .................... B23B 25/02
                                                    82/1.11
(Continued)

FOREIGN PATENT DOCUMENTS

CN 105320075 A 2/2016
JP H02-131839 A 5/1990
(Continued)

OTHER PUBLICATIONS

Berglind, L, & Ziegert, J. "Chip Breaking Parameter Selection for Constant Surface Speed Machining." Proceedings of the ASME 2013 International Mechanical Engineering Congress and Exposition. vol. 2B: Advanced Manufacturing. San Diego, California, USA. Nov. 15-21, 2013. (Year: 2013).*

(Continued)

*Primary Examiner* — Ryan A Jarrett
(74) *Attorney, Agent, or Firm* — Studebaker & Brackett PC

(57) ABSTRACT

A numerical control device according to an aspect of the present disclosure includes: a reference speed calculation unit configured to calculate a spindle speed which is a rotation number of the spindle in accordance with a machining program, and a feed speed which is a movement speed of the feed axis in accordance with the machining program; an oscillation command calculation unit configured to calculate an oscillation command, which is a periodic variation component superimposed on a command of the feed axis, based on the spindle speed and the feed speed, as well as an oscillation frequency magnification set in advance; a setting acquisition unit configured to acquire an upper limit value for frequency of the oscillation command; and an adjustment unit configured to adjust the frequency of the oscillation command, or adjust at least either of the spindle speed and (Continued)

the oscillation frequency magnification, so that the frequency of the oscillation command does not exceed the upper limit value.

7 Claims, 3 Drawing Sheets

(51) Int. Cl.
    *G05B 19/416*     (2006.01)
    *B23Q 17/10*     (2006.01)
    *B23Q 17/22*     (2006.01)

(52) U.S. Cl.
    CPC ..... *B23Q 17/2233* (2013.01); *G05B 19/4163* (2013.01); *B23Q 2717/003* (2013.01)

(56) References Cited

U.S. PATENT DOCUMENTS

2018/0335765 A1* 11/2018 Tezuka ................. G05B 19/404
2019/0033816 A1* 1/2019 Yamamoto ........... G05B 19/182

FOREIGN PATENT DOCUMENTS

| | | |
|---|---|---|
| JP | 2018-094690 A | 6/2018 |
| JP | 2018-181103 A | 11/2018 |
| WO | 2016/038687 A1 | 3/2016 |

OTHER PUBLICATIONS

An Office Action; "Notice of Reasons for Refusal", mailed by the Japanese Patent Office dated Jun. 8, 2021, which corresponds to Japanese Patent Application No. 2019-196946 and is related to U.S. Appl. No. 16/910,996; with English language translation.

An Office Action mailed by the U.S. Patent and Trademark Office dated Feb. 11, 2021, which corresponds to U.S. Appl. No. 16/698,934 and is related to U.S. Appl. No. 16/910,996.

* cited by examiner

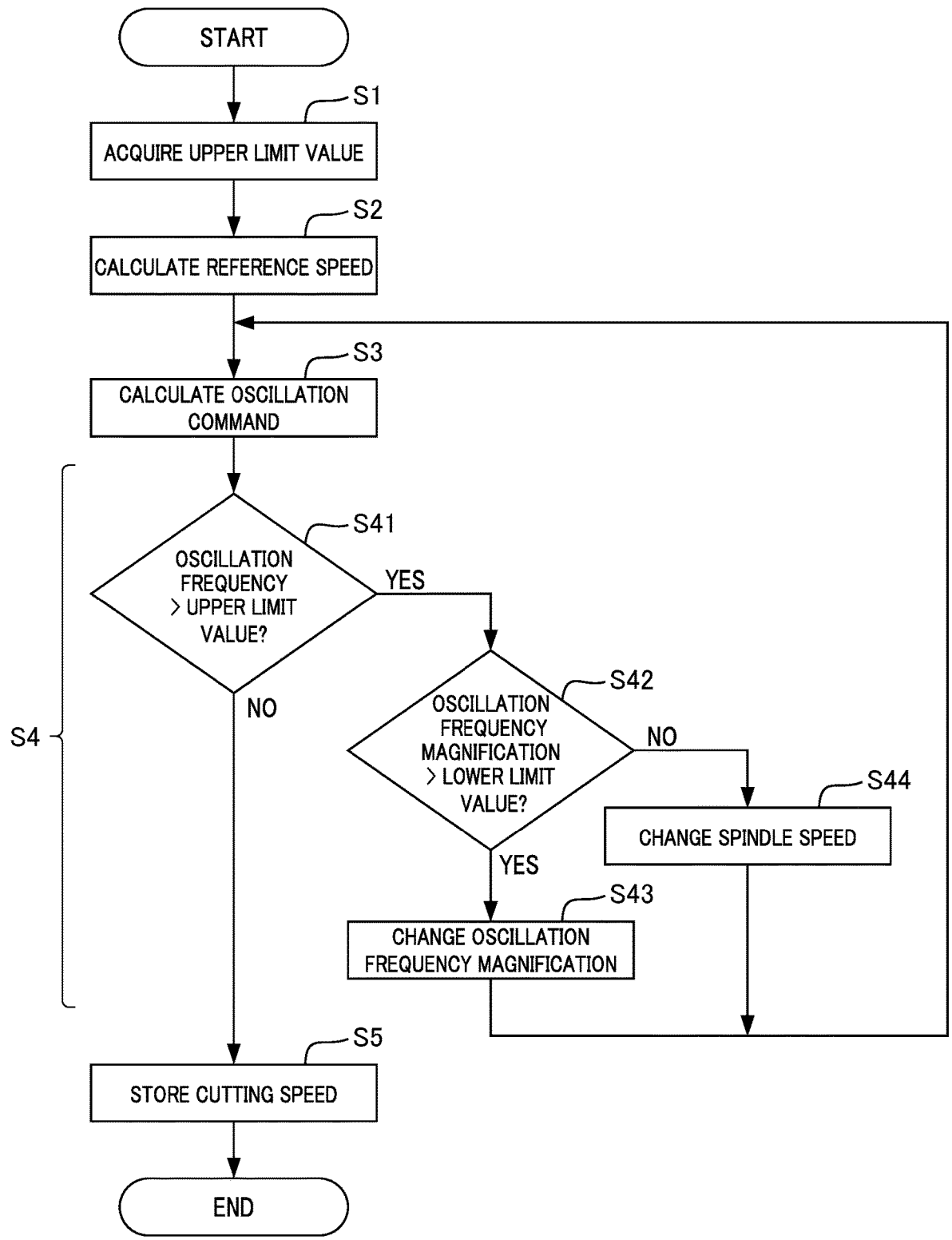

NUMERICAL CONTROL DEVICE, PROGRAM RECORDING MEDIUM, AND CONTROL METHOD

This application is based on and claims the benefit of priority from Japanese Patent Application No. 2019-117548 filed on 25 Jun. 2019, and No. 2020-086543 filed on 18 May 2020 the content of which is incorporated herein by reference.

BACKGROUND OF THE INVENTION

Field of the Invention

The present invention relates to a numerical control device, a program recording medium and a control method.

Related Art

Conventionally, machine tools have been used such as lathes, for example, that have a spindle causing a cutting tool or a workpiece which is a machining target to rotate, and a feed axis causing the cutting tool to relatively move in relation to the workpiece, and causes the spindle and feed axis to cooperatively operate to cut the workpiece by way of the cutting tool. For such a machine tool, it is not uncommon for the spindle and feed axis, as well as other drive axes, to be controlled by a numerical control device.

In addition, with a machine tool such as a lathe, since the cutting edge of the cutting tool normally shaves off material on the surface of the workpiece continuously, the material shaved off becomes long and thin shavings (chips) depending on the material of the workpiece, and there is a possibility of coiling around the cutting tool and inhibiting the machining of the workpiece. Addressing this, as described in Patent Document 1, for example, technology has been known which performs oscillation cutting so as to cause the cutting tool to reciprocally move relative to the workpiece at a predetermined vibration frequency using a numerical control device. With oscillation cutting, since the cutting tool is periodically distanced from the workpiece by reciprocally moving the cutting tool, shavings are cut to a certain length.

Patent Document 1: Japanese Unexamined Patent Application, Publication No. 2018-94690

SUMMARY OF THE INVENTION

In the case of performing oscillation cutting that reciprocally moves the cutting tool in the aforementioned way, the oscillation period of the cutting tool is decided according to the rotation cycle of the spindle, and the oscillation amplitude of the cutting tool is decided according to the feed rate of the cutting tool. The cutting speed of oscillation cutting becomes a speed resulting from superimposing the peripheral velocity by rotation of the spindle, feed rate of the tool and speed of reciprocal movement for oscillation cutting. More specifically, the maximum value V (mm/s) of the cutting speed is represented as $V = v1 + \pi \cdot L \cdot f1 + (k1 \cdot F)/2 \cdot 2\pi \cdot f2$, using the feed rate v1 (mm/s) of the tool, diameter L (mm) of the workpiece W, spindle speed f1 (rev/s), feed amount per revolution (mm/rev), oscillation frequency f2 (Hz) and the oscillation amplitude magnification k1, which is a constant set appropriately. In other words, the cutting speed V is understood to vary according to the oscillation frequency f2.

In general, the range of cutting speed in which appropriate cutting is possible is limited depending on all conditions such as the cutting tool and the material of the workpiece. If the cutting speed becomes excessively large, various troubles may arise such as roughness in the workpiece machined surface due to the occurrence of chattering vibration, excessive load or fatigue on the drive mechanism of the machine tool, and abnormal wear of the cutting tool. For this reason, technology has been desired which can prevent the cutting speed from becoming excessive by suppressing the oscillation frequency.

A numerical control device according to an aspect of the present disclosure is for controlling a machine tool, the machine tool including a spindle for rotating a cutting tool or a workpiece which is a machining target, and a feed axis for relatively moving the cutting tool in relation to the workpiece, and causing the spindle and the feed axis to cooperatively operate to cut the workpiece by way of the cutting tool, the numerical control device including: a reference speed calculation unit configured to calculate a spindle speed which is a rotation number of the spindle in accordance with a machining program, and a feed speed which is a movement speed of the feed axis in accordance with the machining program; an oscillation command calculation unit configured to calculate an oscillation command, which is a periodic variation component superimposed on a command of the feed axis, based on the spindle speed and the feed speed, as well as an oscillation frequency magnification set in advance; a setting acquisition unit configured to acquire an upper limit value for frequency of the oscillation command; and an adjustment unit configured to adjust the frequency of the oscillation command, or adjust at least either of the spindle speed and the oscillation frequency magnification, so that the frequency of the oscillation command does not exceed the upper limit value.

A program recording medium according to another aspect of the present disclosure non-transitorily storing a control program is for controlling a machine tool, the machine tool including a spindle for rotating a cutting tool or a workpiece which is a machining target, and a feed axis for relatively moving the cutting tool in relation to the workpiece, and causing the spindle and the feed axis to cooperatively operate to cut the workpiece by way of the cutting tool, the control program including: a reference speed calculation control part that calculates a spindle speed which is a rotation number of the spindle in accordance with a machining program, and a feed speed which is a movement speed of the feed axis in accordance with the machining program; an oscillation command calculation control part that calculates an oscillation command which is a periodic variation component superimposed on a command of the feed axis, based on the spindle speed and the feed speed, as well as an oscillation frequency magnification set in advance; a setting acquisition control part that acquires an upper limit value for frequency of the oscillation command; and an adjustment control part that adjusts the frequency of the oscillation command or at least either of the spindle speed and the oscillation frequency magnification, so that the frequency of the oscillation command does not exceed the upper limit value.

A control method according to yet another aspect of the present disclosure is for controlling a machine tool, the machine tool including a spindle for rotating a cutting tool or a workpiece which is a machining target, and a feed axis for relatively moving the cutting tool in relation to the workpiece, and causing the spindle and the feed axis to cooperatively operate to cut the workpiece by way of the cutting tool, the control method including the steps of: calculating a spindle speed which is a rotation number of the spindle in accordance with a machining program, and a feed speed which is a movement speed of the feed axis in accordance with the machining program; calculating an oscillation command which is a periodic variation component superimposed on a command of the feed axis, based on the spindle speed and the feed speed, as well as an oscillation frequency magnification set in advance; acquiring an upper limit value for frequency of the oscillation command; and adjusting the frequency of the oscillation command or at least either of the spindle speed and the oscillation frequency magnification, so that the frequency of the oscillation command does not exceed the upper limit value.

According to the numerical control device, program recording medium and control method of the present disclosure, it is possible to prevent the cutting speed from becoming excessive.

BRIEF DESCRIPTION OF THE DRAWINGS

FIG. 3 is a flowchart showing a control sequence of oscillation cutting in the machine tool of FIG. 1.

DETAILED DESCRIPTION OF THE INVENTION

Figure 1:
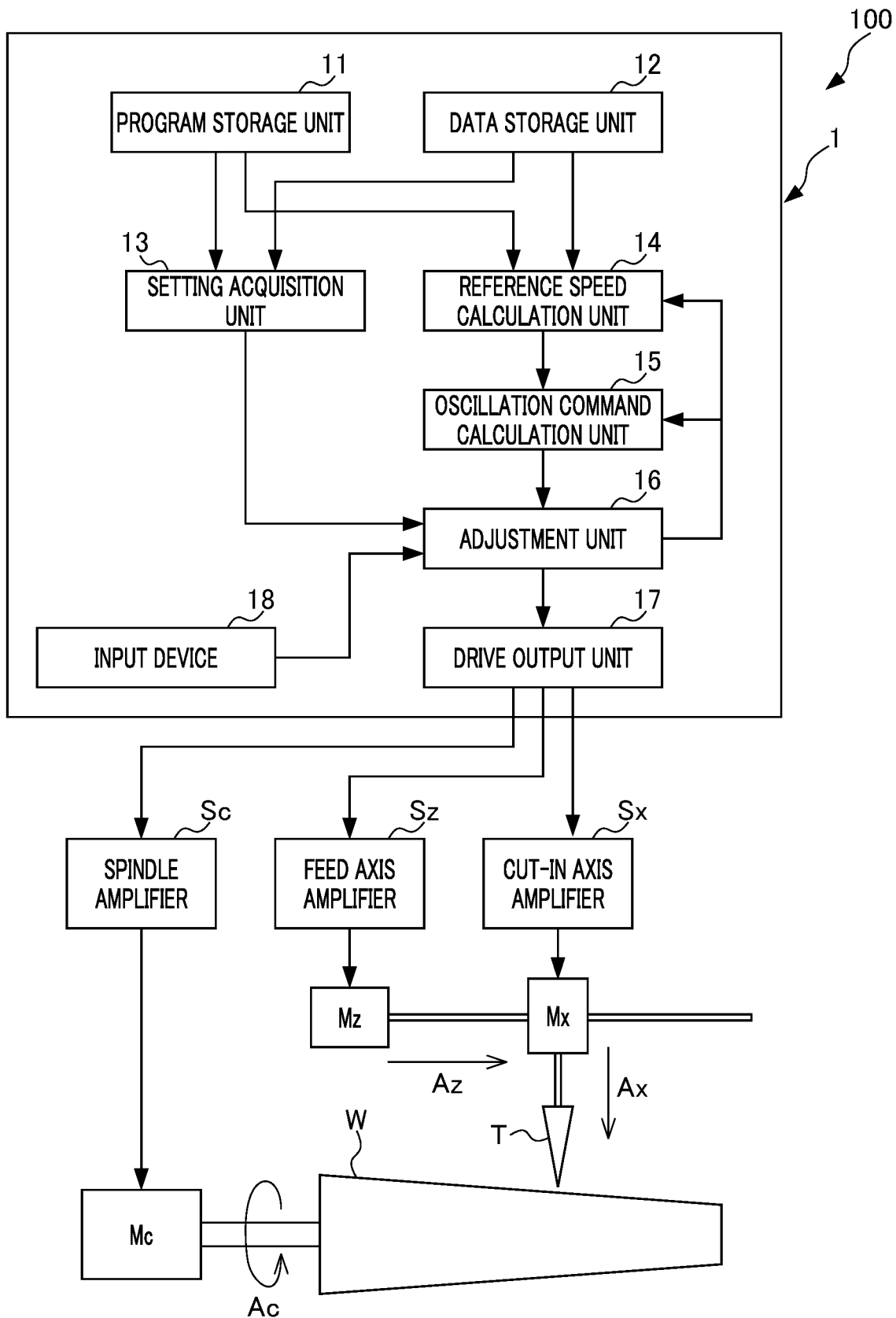
FIG. 1 is a block diagram showing the configuration of a machine tool equipped with a numerical control device according to an embodiment of the present disclosure.

Hereinafter, an embodiment of the present disclosure will be explained while referencing the drawings. FIG. 1 is a block diagram showing the configuration of a machine tool 100 equipped with a numerical control device according to one embodiment of the present disclosure.

The machine tool 100 is an NC lathe that cuts a workpiece W, which is a machining target, using a cutting tool T. The machine tool 100 includes the three control axes of a spindle Ac that causes a cutting tool T or workpiece W to rotate (rotates the workpiece W in the present embodiment); a feed axis Az which causes the cutting tool T to move relative to the workpiece W in a direction parallel to the rotation axis of the spindle Ac (moves the cutting tool T in the present embodiment); and a cut-in axis Ax which causes the cutting tool T to move relative to the workpiece W in the radial direction of the spindle Ac (moves the cutting tool T in the present embodiment). For this reason, the machine tool 100 includes drive motors for driving these control axes Ac, Az, Ax (spindle motor Mc, feed axis motor Mz and cut-in axis motor Mx), and servo amplifiers for applying drive current to the respective drive motors Mc, Mz, Mx (spindle amplifier Sc, feed axis amplifier Sz and cut-in axis amplifier Sx).

The numerical control device 1 controls the machine tool 100 so as to cut the workpiece W by way of the cutting tool T by causing the spindle Ac, feed axis Az and cut-in axis Ax to cooperatively operate. The numerical control device 1 includes: a program storage unit 11, a data storage unit 12, a setting acquisition unit 13, a reference speed calculation unit 14, an oscillation command calculation unit 15, an adjustment unit 16, a drive output unit 17, and an input device 18.

The numerical control device 1 is a device which implements the control method according to the present disclosure. In addition, the numerical control device 1 can be realized by reading a control program according to the present disclosure into a computer device having a CPU, memory, etc., for example. The control program according to the present disclosure can be provided by recording onto a non-transitory recording medium. The respective constituent units of the numerical control device 1 are distinguished in terms of function, and may not necessarily be units which can be clearly separated in the physical configurations and the structure of the program for realizing the numerical control device 1.

The program storage unit 11 stores a machining program which is inputted from outside. The machining program is written according to G code or the like, for example. The numerical control device 1 machines a workpiece W into a desired shape, by controlling the control axes Ac, Az, Ax of the machine tool 100 in accordance with the machining program.

The data storage unit 12 stores the general information required in the machining of the workpiece W. As information stored in the data storage unit 12, for example, it can include a table or the like defining the upper limit value ($f2_{limit}$[Hz]) for the oscillation frequency f2 (Hz) for each combination of a plurality of materials of workpieces W and a plurality of types of cutting tools T.

The setting acquisition unit 13 references the information of the program storage unit 11 and data storage unit 12, and acquires the upper limit value $f2_{limit}$ of the oscillation frequency for the combination of cutting tool T and workpiece W to be used. In addition, the setting acquisition unit 13 references the information of the program storage unit 11 and data storage unit 12, and acquires the initial values of parameters to be used in the oscillation command calculation unit 15 described later, the priority ranking of parameters to be adjusted by the adjustment unit 16, etc.

The reference speed calculation unit 14 calculates the spindle speed (f1[rev/s]), which is the rotation number of the spindle Ac in accordance with the machining program, and the feed rate (v1[mm/s]), which is the movement speed of the feed axis AZ in accordance with the machining program. In more detail, the reference speed calculation unit 14 calculates the spindle speed f1 and feed rate v1 which are optimum, in a case of not performing oscillation control according to the machined shape of the workpiece W written in the machining program.

The oscillation command calculation unit 15 calculates an oscillation command (vo(t) (mm)), which is a periodic variation component superimposed on the feed rate v1, based on the spindle speed f1 and feed rate v1 calculated by the reference speed calculation unit 14, and the parameters acquired by the setting acquisition unit 13. More specifically, the oscillation command calculation unit 15 calculates the oscillation command vo(t) as a command of sine wave form in which the amplitude is the oscillation amplitude r (mm), and the frequency is the oscillation frequency f2.

The oscillation amplitude r is calculated by multiplying the oscillation amplitude magnification k1 set in advance by a value obtained by dividing the feed speed v1 by the spindle speed f1. In other words, it is expressed as $r=(k1 \cdot v1/f1)/2$.

In addition, the oscillation frequency f2 is calculated by multiplying the oscillation frequency magnification k2 set in advance by the spindle speed f1. In other words, the oscillation frequency f2 is expressed as $f2=k2 \cdot f1$.

In addition, the cutting speed becomes the sum of the feed speed of the tool (v1), peripheral velocity of the workpiece ($\pi \times L \times f1$), and the oscillation speed of the tool ($r \times 2\pi \times f2$) (L is the diameter of the workpiece (mm)). In other words, the maximum value V (mm/s) for the cutting speed is expressed as $V=v1+\pi \cdot L \cdot f1+r \cdot 2\pi \cdot f2$. Alternatively, it may be expressed as $V=v1+\pi \cdot L \cdot f1+r \cdot 2n \cdot k2 \cdot f1$, using the spindle speed f1 and oscillation frequency magnification k2.

Figure 2:
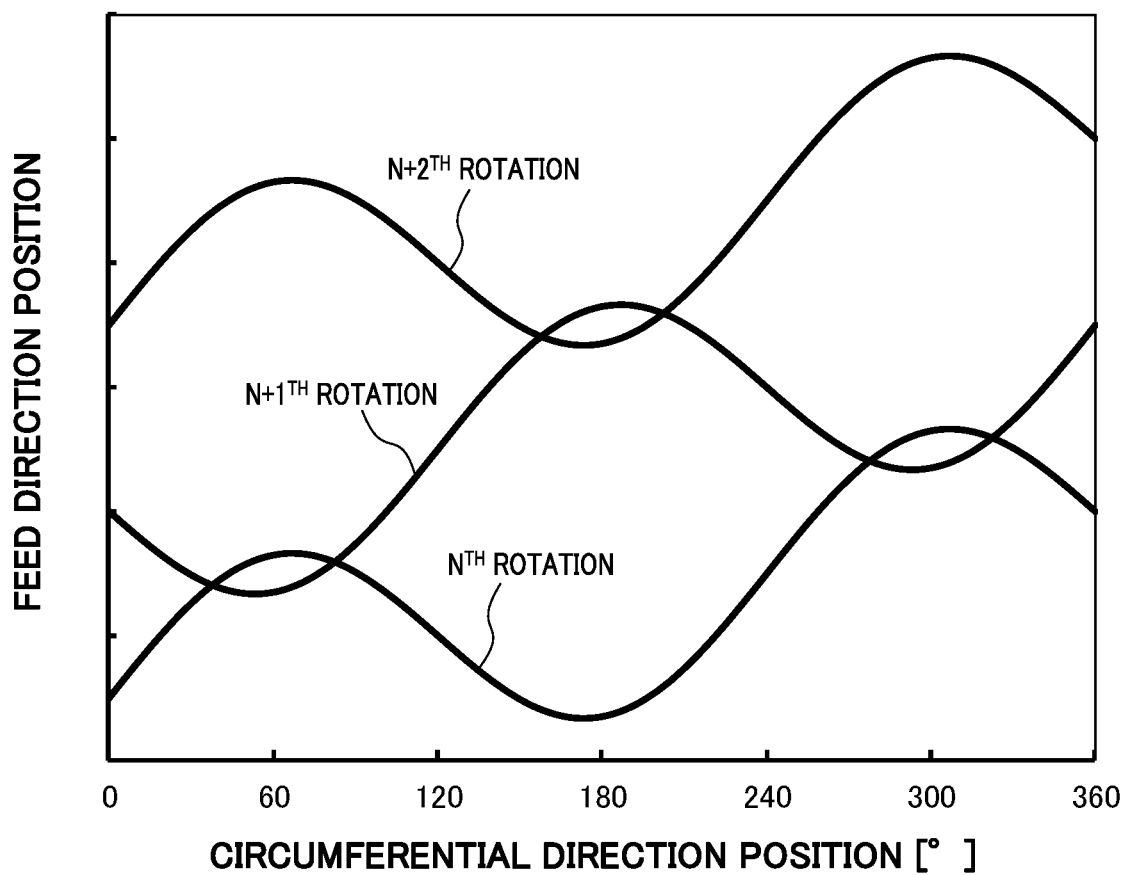
FIG. 2 is a view showing the trajectory of a cutting tool on a workpiece surface during machining by the machine tool of FIG. 1.

The position in the feed axis Az direction of the cutting tool T is expressed as the total of the integrated value of the feed speed v1 and the oscillation command vo(t). When showing this as the change relative to the rotation angle of the spindle Ac, the trajectory of the cutting tool T during the $n^{th}$ rotation of the spindle Ac and the trajectory of the cutting tool T during the $n+1^{th}$ rotation of the spindle Ac, in the case of the oscillation frequency magnification k2 being an odd multiple of 0.5, have phases differing by 180 degrees, as shown in FIG. 2. For this reason, the circumferential direction position of the workpiece W at which the feed direction position of the cutting tool T becomes a local maximum during the $n^{th}$ rotation, and the circumferential direction position of the workpiece W at which the feed direction position of the cutting tool T becomes a local minimum during rotation of the $n+1^{th}$ rotation match.

In a segment in which the trajectory of the cutting tool T during the $n^{th}$ rotation of the spindle Ac and the trajectory of the cutting tool T during the $n+1^{th}$ rotation overlap, the cutting tool T enters a state distanced in the feed axis Az direction from the workpiece W. The generation of chips formed from the material produced by the cutting tool T shaving off the workpiece W ends at the moment when the cutting tool T distances from the workpiece W. In other words, the chips are severed every time the trajectory of the cutting tool T overlaps the previous trajectory.

The adjustment unit 16 performs adjustment so that the oscillation frequency f2 calculated by the oscillation command calculation unit 15 becomes a value not exceeding the upper limit value $f2_{limit}$ acquired from the setting acquisition unit 13. The adjustment may adjust the oscillation frequency f2, or may adjust at least either of the spindle speed f1 and the oscillation frequency magnification k2. In other words, in the case of the oscillation frequency f2 calculated by the oscillation command calculation unit 15 exceeding the upper limit value $f2_{limit}$, the adjustment unit 16 changes the oscillation frequency f2, or changes at least one of the spindle speed f1 and feed speed v1 and causes recalculation in the reference speed calculation unit 14 and oscillation command calculation unit 15.

The adjustment unit 16 may adjust only either one of the spindle speed f1 and oscillation frequency magnification k2, or may adjust both. In the case of adjusting both the spindle speed f1 and the oscillation frequency magnification k2, the adjustment unit 16 may be configured so as to adjust the spindle speed f1 and oscillation frequency magnification k2 so that proportion of the adjustment amounts of the spindle speed f1 and oscillation frequency magnification k2, or the contribution ratio of the adjustment amounts of the spindle speed f1 and oscillation frequency magnification k2 relative to the change amount of the oscillation frequency f2, become constant; may be configured so as to perform rough adjustment with one of the spindle speed f1 and oscillation frequency magnification k2, and perform fine tuning with the other; or may be configured, in the case that the adjustment amount of one of the spindle speed f1 and oscillation frequency magnification k2 reached a predetermined upper limit, so as to adjust only the other one.

It may be configured so that the selection of which of the spindle speed f1 and oscillation frequency magnification k2 to adjust, ratio of the adjustment amounts of the spindle speed f1 and oscillation frequency magnification k2, priority ranking, etc. are designated in the machining program, and acquired by the setting acquisition unit 13, or may be configured so as to be capable of being inputted by the operator via the input device 18. By causing the ratio of the adjustment amounts of the spindle speed f1 and oscillation frequency magnification k2 to change in the adjustment of the oscillation frequency f2 in this way, it is possible to minimize the influence on the machining precision, machining time, etc., for example, depending on each processing (conditions such as material and machined shape of the workpiece W, type of cutting tool, etc.). In particular, by causing the ratio of adjustment amounts of the spindle speed f1 and oscillation frequency magnification k2 to change in accordance with the machining program, it is possible to reliably optimize individual processing. In addition, by selecting one of the spindle speed f1 and oscillation frequency magnification k2 and causing the ratio of the adjustment amounts of the spindle speed f1 and oscillation frequency magnification k2 to change, in accordance with the input of the operator, it is possible to optimize machining, also in a case of using a machining program which does not write such parameters.

The ratio change of the adjustment amounts of the spindle speed f1 and oscillation frequency magnification k2 can be brought about not only by directly designating the ratio of adjustment amounts of the spindle speed f1 and oscillation frequency magnification k2, but also by setting the upper limit for the adjustment amounts of the spindle speed f1 and oscillation frequency magnification k2 (including cases establishing one as not adjustable), and designating the degree of contribution of the adjustment amounts of the spindle speed f1 and feed rate v1 relative to the change amount of the oscillation frequency f2.

The drive output unit 17 inputs a command signal to the spindle amplifier Sc, feed axis amplifier Sz, and cut-in axis amplifier Sx, so as to cause the workpiece W and cutting tool T relatively move at the adjusted spindle speed f1 and oscillation command vo(t), as well as the feed speed v1.

The input device 18, so long as being a configuration allowing input by the user, can be established as a configuration having a keyboard, touch panel, switches or the like, for example, and may be an interface or the like for communicating with a terminal used by the user, or a host control device.

As is evident from the above explanation, the control program of the embodiment according to the present disclosure realizing the numerical control device 1 can be established as a configuration including: a reference speed calculation control part which realizes the reference speed control unit 14 that calculates the spindle speed f1, which is the rotation number of the spindle Ac in accordance with the machining program, and the feed speed v1, which is the movement speed of the feed axis in accordance with the machining program; an oscillation command calculation control part which realizes the oscillation command calculation unit 15 that calculates the oscillation command vo(t), which is a periodic speed variation component superimposed on the feed speed v1, based on the spindle speed f1 and feed speed v1, as well as the oscillation frequency magnification k2 set in advance; a setting acquisition control part which realizes the setting acquisition unit 13 that acquires the upper limit value $f2_{limit}$ of the oscillation frequency f2; and an adjustment control part which realizes the adjustment unit 16 that adjusts the oscillation frequency f2, or adjusts at least either of the spindle speed f1 and oscillation frequency magnification k2, so that the oscillation frequency f2 does not exceed the upper limit value $f2_{limit}$.

In addition, as shown in FIG. 3, the control method of the embodiment according to the present disclosure implemented by the numerical control device 1 can be established as a method including: a step of acquiring the upper limit value $f2_{limit}$ for the oscillation frequency f2 (Step S1: upper limit value acquiring step); a step of calculating the spindle speed f1 and feed speed v1 in accordance with the machining program (Step S2: reference speed calculating step); a step of calculating the oscillation command vo(t) based on the spindle speed f1 and feed speed v1, as well as the oscillation frequency magnification k2 set in advance (Step S3: oscillation command calculating step); a step of adjusting at least either of the spindle speed f1 and oscillation frequency magnification k2 so that the oscillation frequency f2 does not exceed the upper limit value $f2_{limit}$ (Step S4: adjusting step); and a step of storing the spindle speed f1 and oscillation command vo(t) (Step S5: storing step).

The adjusting step of Step S4 can be established as a configuration having a step of confirming whether the oscillation frequency f2 exceeds the upper limit value $f2_{limit}$ (Step S41: oscillation frequency confirming step); a step of confirming whether the oscillation frequency magnification k2 exceeds a lower limit value $k2_{limit}$ set in advance in the case of determining in the confirming step of Step S41 that the oscillation frequency f2 exceeds the upper limit value $f2_{limit}$ (Step S42: oscillation frequency magnification confirming step); a step of changing the oscillation frequency magnification k2 to a smaller value in the case of determining that the oscillation frequency magnification k2 exceeds the lower limit value $k2_{limit}$ (Step S43: oscillation magnification changing step); and a step of changing the spindle speed f1 to a smaller value in the case of determining that the oscillation frequency magnification k2 does not exceed the lower limit value $k2_{limit}$ (Step S44: spindle speed changing step).

In the control method of FIG. 3, in the case of the oscillation frequency f2 being no more than the upper limit value $f2_{limit}$ in the oscillation frequency confirming step, the processing advances to the storing step of Step 35, and stores the spindle speed f1 and oscillation command vo(t). On the other hand, in the case of the oscillation frequency f2 exceeding the upper limit value $f2_{limit}$ in the oscillation frequency confirming step, and adjusting the oscillation frequency f2 in the oscillation magnification changing step or changing the spindle speed f1 in the spindle speed changing step, the processing returns to the oscillation command calculating step of Step S3, and performs recalculation.

In the control method of FIG. 3, in order to configure so that the oscillation frequency f2 upon the machine tool 100 performing machining ultimately does not exceed the upper limit value $f2_{limit}$, the adjusting step preferentially regulates the oscillation frequency magnification k2, and after the oscillation frequency magnification k2 has reached the lower limit value $k2_{limit}$, regulates the spindle speed f1. By preferentially regulating the oscillation frequency magnification k2, a decline in the spindle speed f1 is suppressed, and thus a decline in the machining efficiency is suppressed.

The numerical control device 1, the control program realizing the numerical control device 1, and the control method implemented by the numerical control device 1, upon performing oscillation cutting in the machine tool 100, can prevent the cutting rate from becoming excessive by suppressing the periodic variation component, by suppressing the oscillation frequency f2 to no more than the upper limit value $f2_{limit}$.

Although an embodiment of the present disclosure has been explained above, the present disclosure is not to be limited to the aforementioned embodiment. In addition, the effects described in the present embodiment are merely listing the most preferred effects produced from the present disclosure, and the effects according to the present disclosure are not to be limited to those disclosed in the present embodiment.

As an example, the numerical control device, control program and control method according to the present disclosure may adjust only one of the spindle speed and oscillation frequency magnification, may simultaneously adjust the spindle speed and oscillation frequency magnification, or may preferentially adjust the spindle speed, and when adjustment of the spindle speed has reached its limit, then adjust the spindle frequency magnification.

In the numerical control device, control program and control method according to the present disclosure, the adjustment unit may adjust the frequency of a direct oscillation command. As an example, the adjustment unit may be configured so as to compensate the frequency of the oscillation command to the upper limit value and output, in the case of the frequency of the oscillation command inputted from the oscillation command calculation unit exceeding the upper limit value.

In the numerical control device, control program and control method according to the present disclosure, the waveform of the oscillation command is not limited to sinusoidal, and is sufficient so long as being a waveform which periodically changes, such as a sawtooth wave, triangular wave, trapezoidal wave, and square wave.

The numerical control device, control program and control method according to the present disclosure are not limited to lathes, and can be adopted in the control of a drill press, for example.

EXPLANATION OF REFERENCE NUMERALS 1 numerical control device
13 setting acquisition unit
14 reference speed calculation unit
15 oscillation command calculation unit
16 adjustment unit
17 drive output unit
100 machine tool
Ac spindle
Az feed axis
T cutting tool
W workpiece

What is claimed is:
1. A numerical control device for controlling a machine tool, the machine tool including a spindle for rotating a cutting tool or a workpiece which is a machining target, and a feed axis for relatively moving the cutting tool in relation to the workpiece, and causing the spindle and the feed axis to cooperatively operate to cut the workpiece by way of the cutting tool, the numerical control device comprising:
 a reference speed calculation unit configured to calculate a spindle speed which is a rotation number of the spindle in accordance with a machining program, and a feed speed which is a movement speed of the feed axis in accordance with the machining program;
 an oscillation command calculation unit configured to calculate an oscillation command, which is a periodic variation component superimposed on a command of the feed axis, based on the spindle speed and the feed speed, as well as an oscillation frequency magnification set in advance;

a storage unit configured to define an upper limit value for frequency of the oscillation command for each combination of a material of the workpiece and a type of the cutting tool;

a setting acquisition unit configured to acquire the upper limit value; and an adjustment unit configured to adjust the frequency of the oscillation command, or adjust at least either of the spindle speed and the oscillation frequency magnification, so that the frequency of the oscillation command does not exceed the upper limit value.

2. The numerical control device according to claim 1, wherein the adjustment unit selects and adjusts one of the spindle speed and the oscillation frequency magnification in accordance with the machining program or an input by an operator.

3. The numerical control device according to claim 1, the upper limit value being based on a maximum cutting speed, the maximum cutting speed being a limit of a total speed superimposing a peripheral velocity by rotation of the spindle, the feed speed, and a velocity of reciprocal movement for oscillation cutting.

4. A program storage medium which non-transitorily stores a control program for controlling a machine tool, the machine tool including a spindle for rotating a cutting tool or a workpiece which is a machining target, and a feed axis for relatively moving the cutting tool in relation to the workpiece, and causing the spindle and the feed axis to cooperatively operate to cut the workpiece by way of the cutting tool, the control program comprising:

a reference speed calculation control part that calculates a spindle speed which is a rotation number of the spindle in accordance with a machining program, and a feed speed which is a movement speed of the feed axis in accordance with the machining program;

an oscillation command calculation control part that calculates an oscillation command which is a periodic variation component superimposed on a command of the feed axis, based on the spindle speed and the feed speed, as well as an oscillation frequency magnification set in advance;

a storage part that defines an upper limit value for frequency of the oscillation command for each combination of a material of the workpiece and a type of the cutting tool;

a setting acquisition control part that acquires the upper limit value; and an adjustment control part that adjusts the frequency of the oscillation command or at least either of the spindle speed and the oscillation frequency magnification, so that the frequency of the oscillation command does not exceed the upper limit value.

5. The program storage medium according to claim 4, the upper limit value being based on a maximum cutting speed, the maximum cutting speed being a limit of a total speed superimposing a peripheral velocity by rotation of the spindle, the feed speed, and a velocity of reciprocal movement for oscillation cutting.

6. A control method for controlling a machine tool, the machine tool including a spindle for rotating a cutting tool or a workpiece which is a machining target, and a feed axis for relatively moving the cutting tool in relation to the workpiece, and causing the spindle and the feed axis to cooperatively operate to cut the workpiece by way of the cutting tool, the control method comprising the steps of:

calculating a spindle speed which is a rotation number of the spindle in accordance with a machining program, and a feed speed which is a movement speed of the feed axis in accordance with the machining program;

calculating an oscillation command which is a periodic variation component superimposed on a command of the feed axis, based on the spindle speed and the feed speed, as well as an oscillation frequency magnification set in advance;

defining an upper limit value for frequency of the oscillation command based on a combination of a material of the workpiece and a type of the cutting tool;

acquiring the upper limit value; and adjusting the frequency of the oscillation command or at least either of the spindle speed and the oscillation frequency magnification, so that the frequency of the oscillation command does not exceed the upper limit value.

7. The control method according to claim 6, the upper limit value being based on a maximum cutting speed, the maximum cutting speed being a limit of a total speed superimposing a peripheral velocity by rotation of the spindle, the feed speed, and a velocity of reciprocal movement for oscillation cutting.

\* \* \* \* \*